(12) United States Patent
Murawa et al.

(10) Patent No.: US 6,438,789 B1
(45) Date of Patent: Aug. 27, 2002

(54) WINDSHIELD WIPER BLADE CLEANING SYSTEM

(75) Inventors: John S. Murawa, Clarkston; Thomas W. Cox, Oxford, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/460,504

(22) Filed: Dec. 14, 1999

(51) Int. Cl.⁷ .............................. B60S 1/46; B60S 1/52
(52) U.S. Cl. .................... 15/250.01; 239/284.1
(58) Field of Search .................. 15/250.01, 250.02, 15/250.002, 250.04, 250.001; 239/284.1, 284.2

(56) References Cited

U.S. PATENT DOCUMENTS

| | | | | | |
|---|---|---|---|---|---|
| 2,284,966 A | * | 6/1942 | Rappl et al. | ............. | 15/250.01 |
| 2,961,168 A | * | 11/1960 | Webb | ............. | 15/250.01 |
| 3,213,493 A | * | 10/1965 | Chichester | ............ | 15/250.01 |
| 3,230,564 A | * | 1/1966 | McDevitt | ............ | 15/250.01 |
| 6,082,636 A | * | 7/2000 | Yoshida et al. | .......... | 239/284.1 |
| 6,234,410 B1 | * | 5/2001 | Martin et al. | ............ | 239/284.2 |

FOREIGN PATENT DOCUMENTS

| | | | | | |
|---|---|---|---|---|---|
| DE | 4130892 | * | 3/1992 | ............ | 15/250.002 |
| FR | 2671529 | * | 7/1992 | ............ | 15/250.002 |
| GB | 430366 | * | 6/1935 | ............ | 15/250.01 |

* cited by examiner

Primary Examiner—Gary K. Graham
(74) Attorney, Agent, or Firm—Laura C. Hargitt

(57) ABSTRACT

A windshield wiper blade cleaning system for a vehicle includes a plurality of wiper blades for movement across a windshield of a vehicle. The windshield wiper blade cleaning system includes a nozzle body adapted to be disposed in an air intake plenum of the vehicle and connected to a source of fluid. The nozzle body has a nozzle to extend above the wiper blades in response to fluid pressure from the source of fluid to spray the fluid through the nozzle and onto the wiper blades to clean the wiper blades.

16 Claims, 2 Drawing Sheets

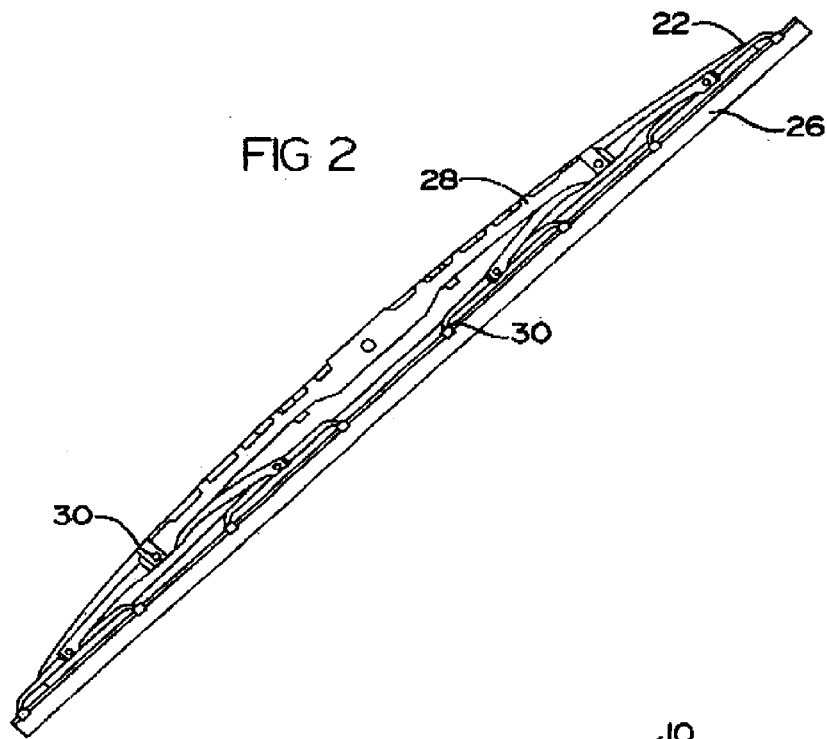
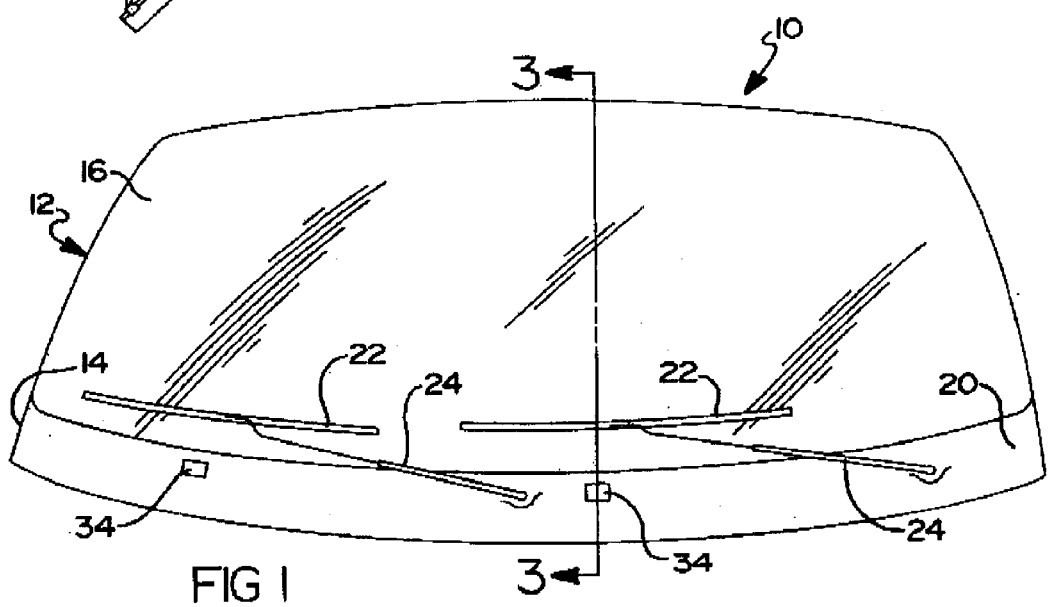

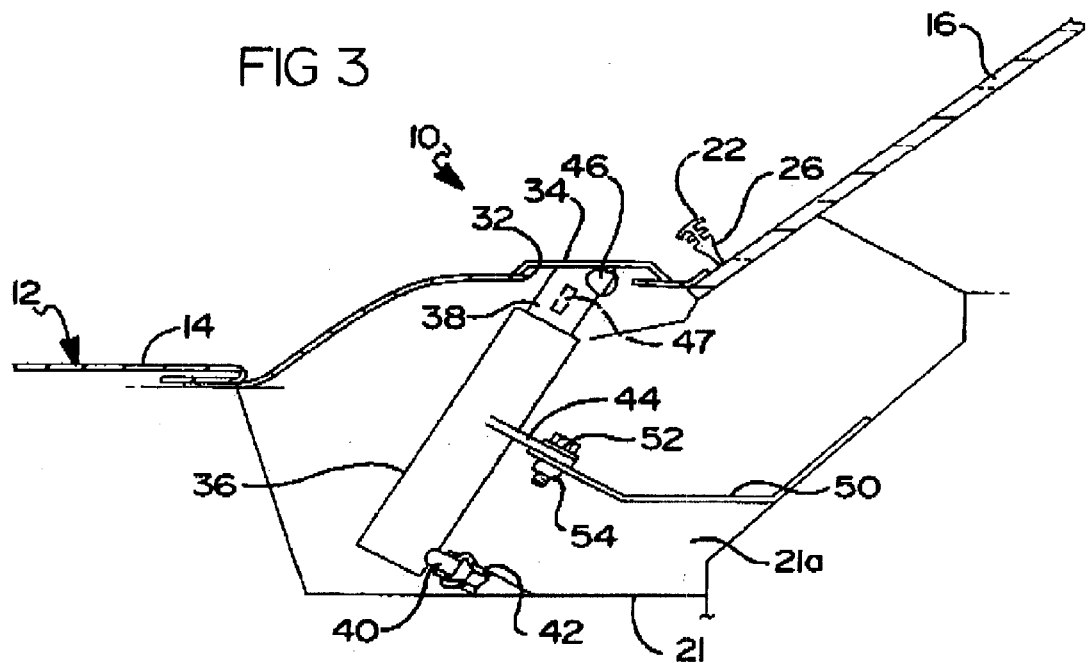

WINDSHIELD WIPER BLADE CLEANING SYSTEM

TECHNICAL FIELD

The present invention relates generally to windshield wiper blades for vehicles and, more particularly, to a windshield wiper blade cleaning system for a vehicle.

BACKGROUND OF THE INVENTION

It is known to provide windshield wiper blades for a windshield of a vehicle. Typically, the windshield wiper blades are activated by an operator of the vehicle to clean the windshield when rain or snow accumulates on the windshield. The windshield wiper blades are pivotally connected to a motor, which pivots the blades back and forth across the surface of the windshield. The vehicle may include a windshield washer system to spray a washer fluid on the windshield to allow the blades to clean the windshield as they move across the windshield. However, when driving during periods of significant snowfall or icing (sleet) conditions, snow/ice may accumulate on the windshield wiper blades, impairing the ability of windshield wiper blades to wipe the surface of the windshield.

Some vehicles may include a device to clean and/or de-ice the windshield wiper blades. For example, one such device may include heated windshield wiper blades. The wiper blades are heated upon vehicle start-up to de-ice and clean the blades. However, the heated windshield wiper blades require substantial time to heat from vehicle start-up. Also, the heated windshield wiper blades are relatively expensive to replace because the blade containing the heating element wears out in approximately nine months on the average.

Another example of a device to clean and/or de-ice the windshield wiper blades is a rubber boot or cover placed over the windshield wiper blades to prevent ice and other foreign matter from accumulating on the blades.

Yet another example of a device to clean and/or de-ice the windshield wiper blades is a heated washer fluid sprayed onto the surface of the windshield from the conventional washer fluid system. However, the heated washer fluid is a relatively expensive system and requires time to activate the system and heat the washer fluid.

Although the above options have worked to some degree, it is desirable to provide a windshield wiper blade cleaning system that works with standard windshield wiper blades. It is also desirable to provide a windshield wiper blade cleaning system that removes accumulated ice, snow and other contaminants from windshield wiper blades to allow for proper wiping action of the wiper blades. Therefore, there is a need in the art to provide a windshield wiper blade cleaning system that meets these desires.

SUMMARY OF THE INVENTION

It is, therefore, one object of the present invention to provide a windshield wiper blade cleaning system for a vehicle.

It is another object of the present invention to provide a windshield wiper blade cleaning system for a vehicle that is reliable and effective to clean or de-ice windshield wiper blades.

It is yet another object of the present invention to provide a windshield wiper blade cleaning system for a vehicle that is functional immediately upon vehicle start-up.

To achieve the foregoing objects, the present invention is a windshield wiper blade cleaning system for a vehicle. The windshield wiper blade cleaning system includes a plurality of wiper blades for movement across a windshield of a vehicle. The windshield wiper blade cleaning system includes a nozzle body adapted to be disposed in an air intake plenum of the vehicle and connected to a source of fluid. The nozzle body has a nozzle to extend above the wiper blades in response to fluid pressure from the source of fluid to spray the fluid through the nozzle and onto the wiper blades to clean the wiper blades.

One advantage of the present invention is that a windshield wiper blade cleaning system is provided for a vehicle. Another advantage of the present invention is that the windshield wiper blade cleaning system uses a high pressure spray of washer fluid to clean/de-ice standard windshield wiper blades and is functional immediately upon vehicle start-up. Yet another advantage of the present invention is that the windshield wiper blade cleaning system provides a reliable, effective method to clean or de-ice windshield wiper blades. Still another advantage of the present invention is that the windshield wiper blade cleaning system improves wiper performance, resulting in improved visibility. A further advantage of the present invention is that the windshield wiper blade cleaning system may also remove contaminants from the wiper blade during above freezing conditions to improve wipe quality. Yet a further advantage of the present invention is that standard windshield washer fluid is delivered at high pressure through telescoping nozzles aimed at the wiper blades to remove ice, snow or other contaminants from the windshield wiper blades to allow for proper wiping action of the blades.

Other objects, features and advantages of the present invention will be readily appreciated, as the same becomes better understood after reading the subsequent description taken in conjunction with the accompanying drawings.

BRIEF DESCRIPTION OF THE DRAWINGS

FIG. 1 is an elevational view of a windshield wiper blade cleaning system, according to the present invention, illustrated in operational relationship with a vehicle.

FIG. 2 is an elevational view of a wiper blade of the windshield wiper blade cleaning system of FIG. 1.

FIG. 3 is a sectional view taken along line 3—3 of FIG. 1.

FIG. 4 is a view similar to FIG. 3 illustrating the windshield wiper blade cleaning system in an operative position.

DESCRIPTION OF THE PREFERRED EMBODIMENT

Referring to the drawings and in particular FIGS. 1 through 3, one embodiment of a windshield wiper blade cleaning system 10, according to the present invention, is shown for a vehicle, such as a motor vehicle, generally indicated at 12. The vehicle 12 includes a vehicle body 14 (partially shown) and a windshield 16 disposed in a forward opening of the vehicle body 14. The vehicle body 14 includes a hood 18 extending longitudinally from a forward end toward the windshield 16 and an air inlet panel 20 extending laterally and longitudinally between the hood 18 and the windshield 16. The vehicle body 14 also includes a plenum structure 21 disposed below the air intake panel 20 to form a fresh air intake plenum 21a. The vehicle 12 also includes at least one, preferably a pair of wiper blades 22 and wiper arms 24 pivotally connected to a motor (not shown) to pivot the wiper blades 22 back and forth across a surface of the windshield 16. It should also be appreciated that, except for the windshield wiper blade cleaning system 10, the vehicle 12 is conventional and known in the art.

Referring to FIG. 2, the wiper blade 22 includes a squeegee element 26 extending laterally and an element support structure 28 extending laterally and pivotally connected to the squeegee element 26 by pivoting joints 30. The element support structure 28 is connected to the wiper arm 24. It should be appreciated that the wiper blade 22 is conventional and known in the art.

Referring to FIG. 3, the windshield wiper blade cleaning system 10 includes a plurality of, preferably two, openings 32 in the air inlet panel 32. The openings 32 are spaced laterally and aligned with each wiper blade 22. The openings 32 are generally rectangular in shape, but may have any suitable shape. The windshield wiper blade cleaning system 10 also includes a plurality of, preferably two cover plates 34 to cover the openings 32. The cover plates 34 are generally rectangular in shape, but may have any suitable shape to cover the openings 32.

The windshield wiper blade cleaning system 10 also includes a telescoping nozzle body 36 disposed beneath the air inlet panel 20 in the fresh air intake plenum 21a. The nozzle body 36 has a telescoping portion 38 connected to the cover plate 34. The nozzle body 36 has a hose connector 40 extending from a lower end thereof and a hose 42 having one end connected to the hose connector 40 and another end connected to a washer pump (not shown) disposed in a washer reservoir (not shown). The nozzle body 36 may have a flange 44 extending outwardly for a function to be described. The telescoping portion 38 includes at least one nozzle 46 to spray a fluid such as a washer fluid supplied by the washer pump from the washer reservoir through the hose 42, hose connection 40, nozzle body 36 and telescoping portion 38 to the nozzle 46. The nozzle body 36 also includes an internal check valve 47 disposed in the telescoping portion 38 prior to the nozzle 46 to allow washer fluid to reach the nozzle 46 at a predetermined pressure. It should be appreciated that the nozzle 46 sprays the fluid in a pattern indicated by the lines 48 in FIG. 4. It should also be appreciated that the washer pump supplies the fluid at a predetermined pressure such as approximately sixty (60) pounds per square inch (psi) to the nozzle 46. It should be appreciated that a switch (not shown) is provided for the operator to activate the windshield wiper blade cleaning system 10 on demand. It should further be appreciated that the nozzle body 36 is conventional and known in the headlamp washing art.

The windshield wiper blade cleaning system 10 includes at least one bracket 50 connected to the intake plenum structure 21 by suitable means such as welding. The windshield wiper blade cleaning system 10 also includes at least one fastener 52 such as a bolt extending through the flange 44 on the nozzle body 36 and the bracket 50 and a nut 54 threadably engaging the fastener 52 to connect the nozzle body 36 to the intake plenum structure 21.

Referring to FIGS. 1, 3 and 4, the wiper blades 22 are shown in an inactive or park position, which is the location where cleaning/deicing occurs. In operation, an operator activates a switch (not shown) to activate the windshield wiper blade cleaning system 10. The washer pump, which is disposed in the washer fluid reservoir, pumps the washer fluid at a high pressure to the nozzle body 36 via the hose 42 and hose connection 40. The nozzle body 36 is hidden under the air inlet panel 20. As fluid pressure builds, the nozzle body 36 telescopes the telescoping portion 38 and lifts the cover plate 34 from an inactive or retracted position illustrated in FIG. 3 to an active or extended position such that the nozzle 46 is elevated above the wiper blade 22 illustrated in FIG. 4. At approximately 60 psi of fluid pressure in the telescoping portion 38, the internal check valve 47 therein opens and fluid is dispersed or sprayed in the spray pattern 48 to cover the wiper blade 22. The spray pattern 48 covers the wiper blade 22 from heel to tip. The force of the spray pattern 48 will remove accumulated ice, snow, or other contaminants from the wiper blade 22. The washer fluid will seep into the pivoting joints 30 and dissolve ice accumulation at the pivoting joints 30 to allow the squeegee element 26 to flex as intended and follow the wrap of the surface of the windshield 16. When the operator activated switch is released, the telescoping portion 38 of the nozzle body 36 is retracted to the hidden or stowed position with the cover plate 34 covering the opening 32 as illustrated in FIG. 3. It should be appreciated that the entire activation, fluid delivery and retraction of the nozzles will require a minimum of approximately three seconds. It should also be appreciated that a wiper motor controller circuit (not shown) can be timed to activate the wiper blades 22 to remove overspray from the windshield 16 with a single or multiple wipes.

Accordingly, the windshield wiper blade cleaning system 10 operates by having standard windshield washer fluid delivered at high pressure onto the wiper blades 22 to remove ice and snow and other contaminants from the squeegee element 26 and element support structure 28. This will allow the squeegee element 26 to flex and return to a normal wiping action as well as remove any snow/ice content that the blade was "riding" on. It should be appreciated that, in non-freezing conditions, the spray force may be capable of removing other normally acquired contaminants from the wiper blade 22 such as wax, insects, dirt, etc., to eliminate poor wiping performance.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A windshield wiper blade cleaning system for a vehicle comprising:

a plurality of wiper blades for movement across a windshield of a vehicle;

a nozzle body adapted to be disposed in an air intake plenum of the vehicle and connected to a source of fluid; and said nozzle body having a nozzle and an internal check valve operable to provide fluid communication from the source of fluid to said nozzle when the fluid pressure reaches a predetermined level, said nozzle having a stored position in said air intake plenum and an extended position above the air intake plenum and aimed downwardly and directly at said wiper blades, wherein said nozzle extends to the extended position in response to fluid pressure from said check valve to spray the fluid directly onto said wiper blades to clean said wiper blades while said wiper blades are in a parked, inactive position.

2. A windshield wiper blade cleaning system as set forth in claim 1 including an opening in an air intake panel covering the air intake plenum and a cover plate attached to said nozzle body to cover said opening.

3. A windshield wiper blade cleaning system as set forth in claim 1 including a fastening mechanism to fasten said nozzle body to the air intake plenum structure of the vehicle.

4. A windshield wiper blade cleaning system as set forth in claim 3 wherein said fastening mechanism comprises a fastener and a nut.

5. A windshield wiper blade cleaning system as set forth in claim 1 wherein said nozzle body includes a fluid connector and a hose connected to said fluid connector for connection to the source of fluid.

6. A windshield wiper blade cleaning system as set forth in claim 1 wherein said nozzle body has a plurality of nozzles.

7. A windshield wiper blade cleaning system as set forth in claim 1 including at least one of said nozzle body for each of one of said wiper blades.

8. A windshield wiper blade cleaning system as set forth in claim 1 wherein said nozzle body includes a telescoping portion, said nozzle being connected to said telescoping portion.

9. A windshield wiper blade cleaning system for a vehicle having a vehicle body with a window comprising:
    at least one wiper blade for connection to the vehicle body and for movement across the window;
    at least one nozzle body adapted to be disposed below an air intake panel and in an air intake plenum of the vehicle body and connected to the vehicle body and fluidly connected to a washer fluid reservoir containing washer fluid; and
    said at least one nozzle body having at least one nozzle and an internal check valve operable to provide fluid communication from the source of fluid to said at least one nozzle when the fluid pressure reaches a predetermined level, said at least one nozzle having a stored position in said air intake plenum and an extended position above the air intake plenum and aimed downwardly and directly at said wiper blades, wherein said at least one nozzle extends to the extended position in response to fluid pressure from said check valve to spray the fluid directly onto said at least one wiper blade to clean said at least one wiper blade while said wiper blade is in a parked, inactive position.

10. A windshield wiper blade cleaning system as set forth in claim 9 wherein said at least one nozzle body includes a telescoping portion, said at least one nozzle being connected to said telescoping portion.

11. A windshield wiper blade cleaning system as set forth in claim 10 including a cover plate attached to said telescoping portion to cover the opening.

12. A windshield wiper blade cleaning system as set forth in claim 9 including a fastening mechanism to fasten said at least one nozzle body to the vehicle body.

13. A windshield wiper blade cleaning system as set forth in claim 12 wherein said fastening mechanism comprises a fastener and a nut.

14. A windshield wiper blade cleaning system as set forth in claim 9 wherein said at least one nozzle body includes a fluid connector and a hose connected to said fluid connector for connection to the washer fluid reservoir.

15. A windshield wiper blade cleaning system as set forth in claim 9 wherein said nozzle body has a plurality of nozzles.

16. A windshield wiper blade cleaning system for a vehicle having a vehicle body with a window comprising:
    a plurality of wiper blades for connection to the vehicle body and for movement across the window;
    a plurality of nozzle bodies adapted to be disposed below an air intake panel and in an air intake plenum of the vehicle body and connected to the vehicle body and fluidly connected to a washer fluid reservoir containing washer fluid; and
    said nozzle bodies each having at least one nozzle and an internal check valve operable to provide fluid communication from the source of fluid to said at least one nozzle when the fluid pressure reaches a predetermined level, said at least one nozzle having a stored position in said air intake plenum and an extended position above the air intake plenum and aimed downwardly and directly at said wiper blades, wherein said nozzle extends to the extended position in response to fluid pressure from said check valve to spray the fluid directly onto said wiper blades to clean said wiper blades while said wiper blades are in a parked, inactive position.

\* \* \* \* \*